United States Patent
Weimer et al.

(10) Patent No.: US 8,790,487 B2
(45) Date of Patent: Jul. 29, 2014

(54) METHOD OF FABRICATING A PART OUT OF REINFORCED COMPOSITE MATERIAL, AND A METHOD OF REPAIRING SUCH A PART

(75) Inventors: Christian Weimer, München (DE); Nikolaus Bätge, Deisenhofen (DE); Hans Luinge, München (DE); Georg Wachinger, Rosenheim (DE); Patricia Parlevliet, München (DE)

(73) Assignees: Airbus Helicopters Deutschland GmbH, Donauwoerth (DE); EADS Deutschland GmbH, Ottobrunn (DE)

( * ) Notice: Subject to any disclaimer, the term of this patent is extended or adjusted under 35 U.S.C. 154(b) by 433 days.

(21) Appl. No.: 13/007,713

(22) Filed: Jan. 17, 2011

(65) Prior Publication Data
US 2011/0174426 A1 Jul. 21, 2011

(30) Foreign Application Priority Data

Jan. 18, 2010 (EP) .................................. 10400011

(51) Int. Cl.
*B32B 37/00* (2006.01)
*B29C 65/00* (2006.01)

(52) U.S. Cl.
USPC .......... 156/308.2; 156/83; 156/245; 156/313; 264/258; 264/263

(58) Field of Classification Search
USPC ............... 156/245, 308.2, 309.6, 313, 83, 79, 156/285, 286, 306.6; 264/257, 258, 263
See application file for complete search history.

(56) References Cited

U.S. PATENT DOCUMENTS

| 4,988,469 A * | 1/1991 | Reavely et al. ................ 264/113 |
| 7,138,028 B2 | 11/2006 | Burpo |
| 7,175,795 B2 * | 2/2007 | Eberth et al. .................. 264/250 |
| 2003/0019567 A1 | 1/2003 | Burpo |
| 2005/0059309 A1 * | 3/2005 | Tsotsis .......................... 442/381 |
| 2005/0257887 A1 * | 11/2005 | Tsotsis ....................... 156/308.2 |
| 2007/0035058 A1 * | 2/2007 | Ogle et al. ..................... 264/113 |
| 2008/0289743 A1 * | 11/2008 | Tsotsis ............................ 156/93 |
| 2008/0305705 A1 * | 12/2008 | Kolzer ........................... 442/387 |
| 2009/0061709 A1 * | 3/2009 | Nakai et al. .................... 442/170 |

FOREIGN PATENT DOCUMENTS

| DE | 102004025381 A1 | 12/2005 |
| EP | 1342553 A1 | 9/2003 |
| EP | 1317501 B1 | 11/2006 |
| GB | 2225277 A | 2/1989 |

OTHER PUBLICATIONS

Search Report and Written Opinion Application No. EP 10400011 Dated Sep. 6, 2010.

* cited by examiner

*Primary Examiner* — John Goff
(74) *Attorney, Agent, or Firm* — Brooks Kushman P.C.

(57) ABSTRACT

The present invention relates to a method of fabricating a composite part presenting an integral structure of composite material comprising at least one reinforcing layer based on reinforcing fibers, fabrics, or textiles, and at least one impregnation matrix, the method consisting in assembling the integral structure, in placing said integral structure in a mold, in impregnating said integral structure with the impregnation matrix by injection or infusion, and in solidifying said impregnated integral structure by raising it to a determined temperature, the method being characterized in that it consists in: using at least two distinct primary parts for making up the integral structure; placing a thermoplastic sheet on at least one of the primary parts so as to make the interface between said primary parts once they are assembled together.

13 Claims, 3 Drawing Sheets

METHOD OF FABRICATING A PART OUT OF REINFORCED COMPOSITE MATERIAL, AND A METHOD OF REPAIRING SUCH A PART

CROSS REFERENCE TO RELATED APPLICATIONS

This application claims the benefit of EP 10 400011.2 filed on Jan. 18, 2010. The disclosure of which is incorporated in its entirety by reference herein.

FIELD OF THE INVENTION

The present invention relates to the general technical field of fabricating one-piece or "integral" parts comprising fiber-based reinforcement and resin. For example, such parts are obtained by molding a composite material comprising reinforcing fibers, fabrics, parts are for use in the aviation industry, aerospace structures, automotive industry or wind-energy industry.

The term "impregnation matrix" should be understood as covering any type of polymer resin or polymer resin mixture presenting low viscosity and that is solidified by being polymerized. Low viscosity is needed such that any kind of infusion or injection process is possible. The viscosity of a matrix or resin in the Prepreg technology (resin is already in the prepreg) can of course be higher.

The term "fiber" is used below to designate any type of structural fiber such as carbon fibers, glass fibers, aramid fibers, polyethylene (polyolefines), basalt or natural fibers.

BACKGROUND OF THE INVENTION

Known molding methods are not described in detail herein.

The invention relates more particularly to Liquid Composite Moulding (LCM) methods, which include various methods such as Vacuum Assisted Resin Transfer Moulding (VARTM), resin transfer moulding (RTM), liquid resin infusion (LRI), vacuum assisted process (VAP), or Seemann Composite Resin Infusion Moulding Process (SCRIMP) or any other method such as Combined Prepreg Infusion (CPI), Same Qualified Resin Transfer Moulding (SQRTM) or Controlled Atmospheric Pressure Resin Infusion (CAPRI). The invention is also suitable for Prepreg technology.

The most of these methods often share in common at least one step that consists in impregnating at least one layer of dry reinforcing fibers.

In the following the term "infusion" means that for instance a resin is sucked through a preform by applying vacuum and the term "injection" means that a resin is injected with additional pressure in a preform.

By way of example, the present invention relates to fabricating parts, e.g. parts of large dimensions or presenting complex structures, for which it can be difficult or even impossible to achieve a complete infiltration of resin or for which, in case of using different resins, the resin separation might be difficult. Another application of the invention is therefore the separation of different infusion and/or Prepreg resins.

Composite parts made using the above-mentioned methods, and in particular parts of large dimensions or of complex structure, may present mechanical properties that are locally inappropriate or insufficient. This gives rise for example to zones of weakness or to zones that present insufficient mechanical properties. A poor flow through the reinforcing fibers, e.g. as a result of unsuitable viscosity of the impregnation matrix, can give rise to such defects. When the flow of the impregnation matrix within the integral structure is not sufficiently under control, it can happen that e.g. the fibers are locally insufficiently impregnated.

In addition, the bonds between primary parts making up an integral structure often present shear strength and peel strength, that are insufficient. This applies for example when assembling panel elements and stiffening elements as happens in airplane fuselages.

In an attempt to solve this kind of problem, it is known to have recourse to various technical solutions. Thus, document U.S. Pat. No. 7,138,028 discloses depositing additional reinforcing layers in the bonding zones between the component parts of an integral structure. Because of the complexity of such structures, it becomes difficult to control the manufacturing so that one is faced with a major risk of not achieving the looked-for properties.

The integral structures obtained in that way are also not suitable for being easily repaired. As a general rule they need to be replaced in full even if only one of their component portions is damaged significantly. Smaller damages can be repaired, but do involve very complex repair methods due to bad accessibility for example.

Another technical solution, e.g. as disclosed in document EP 1 317 501, consists in using a thermoplastic sheet or a thermoplastic powder, for example, placed at the interface between primary parts making up an integral structure. The thermoplastic sheet has an influence on the properties of the impregnation matrix, encouraging it to diffuse within the fiber layer. Those integral structures are not suitable for being repaired. It is therefore necessary to replace them in full when severely damaged, even if only one of their component portions is damaged.

The composite parts obtained by known fabrication methods thus present the drawback that they can no longer be melted and reshaped for repair purposes.

The integration/assembly of different parts can also be achieved in a known way through riveting or bolting, causing holes in the structure and additional weight.

SUMMARY OF THE INVENTION

The object of the present invention is consequently to remedy the above-mentioned drawbacks and to propose a novel method of fabricating reinforced composite parts that are optimized in particular in terms of their physical properties.

Another object of the present invention is to propose a novel method of fabrication that is particularly simple and reliable for making a reinforced composite part with a small number of implementation steps.

Another object of the present invention is to propose a novel method of repairing a reinforced composite part that is particularly simple and reliable and that uses a small number of implementation steps.

The objects given to the invention are achieved with the help of a method of fabricating a composite part presenting a structure of composite material comprising at least one reinforcing layer based on reinforcing fibers, fabrics, or textiles, and at least one impregnation matrix, the method consisting in assembling the structure, in placing said structure in a mold, in impregnating said structure with the impregnation matrix by injection or infusion, and in solidifying said impregnated integral structure by raising it to a determined temperature, the method being characterized in that it consists in:

using at least two distinct primary parts for making up an integral structure;

and placing a thermoplastic sheet on at least one of the primary parts or in between the primary parts, so as to make the interface of the integral structure.

In a first implementation in accordance with the invention, the method consists in using a source of heat, at least locally in defined positions, to bond together the primary parts prior to the injection or infusion operation.

In an implementation in accordance with the invention, the method consists in using a thermoplastic sheet. Such thermoplastic sheets can be (partially) crystalline or amorphous.

The softening point (glass transition temperature or melting point) of these thermoplastic sheets should be between −70° C. and 500° C. and preferably between 70° C. and 250° C.

In an implementation in accordance with the invention, the method consists in using an impregnation matrix(ces) with a solidification temperature lying in the range 120° C. to 300° C.

In another implementation in accordance with the invention, room temperature curing resins might be used as well.

So the curing (solidification) temperature should be between 20° C. and 300° C. and preferably between 120° C. and 200° C.

Curing techniques such as UV curing or e-beam curing could also be applied.

In an implementation in accordance with the invention, the method consists in using a thermoplastic sheet made up of one or more of the following materials, PSU, PPSU, PES, SRP, polyamides, poly(ether imide) PEI, phenoxy and copolymers. The thermoplastic sheet must adhere well to the matrix system used. This adhesion can be achieved by partial dissolution of the thermoplastic sheet or by chemical bonding between the thermoplastic sheet and the matrix.

By way of example, the thermoplastic sheet presents thickness lying in the range 0.02 mm to 1 mm, preferably between 0.02 mm and 0.4 mm and most preferably between 0.02 mm and 0.05 mm.

By way of example, the materials constituting the thermoplastic sheet include at least one material that expands under the effect of heat. Such expansion serves to improve joining between the portions of the integral structure that need to be bonded together. An example of expanding materials is a foaming agent such as a graphite or an organic foaming agent.

By way of example, the materials constituting the thermoplastic sheet include at least one electrically-conductive material such as soot, carbon nanotubes, graphite/graphene and/or metallic particles to allow dedicated heating of the sheet by one of the later mentioned heating mechanisms.

By way of example, the materials constituting the thermoplastic sheet include at least one flame retardant material. Such materials are for instance active materials such as expandable graphite or phosphorous based materials or passive materials such as inorganic fillers (e.g. nanoclays).

According to an implementation of the method in accordance with the invention, the primary parts comprise at least two preforms comprising dry reinforcing fibers. These fibers may be constituted, for example, by carbon fibers, glass fibers, aramid fibers, polyethylene (polyolefines), basalt or natural fibers.

According to another implementation of the method in accordance with the invention, the primary parts comprise pre-impregnated preforms and/or Prepregs and at least one preform comprising dry reinforcing fibers. Such preforms are themselves known and are not described in greater detail herein.

According to another implementation of the method in accordance with the invention, the primary parts are preforms of different kinds, one of the primary parts being a pre-impregnated preform or a Prepreg, the other being a preform comprising dry reinforcing fibers.

According to another implementation of the method in accordance with the invention, the primary parts (1, 2c) are of different kinds, one of the primary parts being a preform comprising dry reinforcing fibers, the other being a solidified part.

According to an implementation in accordance with the invention, the method consists in using a single impregnation matrix for impregnating the primary part(s).

According to an implementation in accordance with the invention, the method consists in using a first impregnation matrix for impregnating one of the primary parts, and in using a second impregnation matrix, different from the first impregnation matrix, for impregnating the other primary part(s).

A configuration with a thermoplastic sheet also serves to mitigate poor mutual adhesion between different polymers making up the impregnation matrices. The thermoplastic sheet then acts as a layer of adhesive between the different polymers. It is therefore possible to seek out specific properties in each portion impregnated with a specific polymer, without decreasing the mechanical bonding between said portions.

Because of the various options listed above, it becomes possible to make up an integral structure that presents properties that differ in accurately defined zones.

By way of example, the impregnation matrix(ces) is/are selected from a family of compositions comprising epoxies, polyamides, polyimides (BMI) and cyanate esters.

According to an implementation in accordance with the invention, the method consists, during the solidification step, in also subjecting the impregnated integral structure to a vacuum or to a pressure greater than atmospheric pressure.

An advantage of the method in accordance with the invention lies in the ability to obtain better control or even to direct the flow of the impregnation matrix in integral structures by using a thermoplastic sheet. The sheet serves to separate the zones that are to be impregnated, either to influence the flow of the matrix by defining a specific and preferred path, or to define zones for impregnating with different matrices. If two different matrices are used, where previously only two structures could be manufactured prior to a bonding step, it is now possible to make an integrated structure using different matrix systems and to suppress some production steps.

It is then possible to define zones in a single integral structure that have properties and/or functions that differ. It is also possible to configure more accurately the transition zones between the various domains of integral structures.

Another advantage of the method in accordance with the invention lies in the improvement to its mechanical properties at the bonds between the various portions of a single integral structure.

Another advantage of the method in accordance with the invention lies in providing the integral structure with properties and/or functions that are novel, and to do so by means of the materials making up the thermoplastic sheet.

Another advantage of the method in accordance with the invention lies in the possibility of repairing composite elements made using said method, with only the damaged portion being replaced. In the past, such a repair has not been possible for severe damage with known methods of one-shot fabrication, since, unlike a thermoplastic sheet, once conventional composite elements have solidified they can no longer be melted in order to separate them.

Another advantage of the method in accordance with the invention is obtained by the fact that it is no longer necessary to make up the integral structure with pre-impregnated elements that are generally relatively expensive and that need to be put into place by hand.

Fabrication by means of the method in accordance with the invention is also fast and many kinds of curing steps (solidification or polymerization) could be used such as curing in an autoclave, curing in an oven, rtm-press, Quickstep™, UV curing or other means for generating heat such as microwave, induction or e-beam.

The objects given to the invention are also achieved with the help of a method of fabricating a composite part presenting a structure of composite material comprising at least one reinforcing layer based on reinforcing fibers, fabrics, or textiles, and at least one impregnation matrix, the method consisting in assembling the structure, in placing said structure in a mold, and in solidifying said impregnated structure by raising it to a determined temperature, the method being characterized in that it consists in:

using at least two distinct primary parts for making up an integral structure, one of these parts is a Prepreg or a pre-impregnated preform, the other part being a Prepreg, a pre-impregnated preform or a solidified part,
and placing a thermoplastic sheet on at least one of the primary parts or in between the primary parts so as to make the interface of the integral structure.

The objects given to the invention are also achieved with the help of a method of repairing a composite part obtained by the above-specified method, the repair method being characterized in that it consists in:

heating the composite part at least at the joint of a primary part and a damaged primary part by means of a heat source to melt the thermoplastic sheet; resulting in possible separation of parts;
replacing the damaged primary part by a new primary part that has previously been impregnated and solidified;
depositing a new thermoplastic sheet at the interface between the primary parts; and
solidifying the new impregnated integral structure by raising it to a determined temperature and by applying a determined pressure at the interface between said primary parts in order to bond them together by solidifying the thermoplastic sheet.

The objects given to the invention are also achieved with the help of a method of repairing a composite part obtained by the above-specified method, characterized in that it consists in:

heating the composite part at least at the joint of the primary part and a damaged primary part by means of a heat source (e.g. induction as mentioned before), to melt the thermoplastic sheet; and separating the parts,
replacing the damaged primary part with a preform constituting a new primary part based on dry reinforcing fibers;
depositing a new thermoplastic sheet at the interface between the primary part and the new primary part;
placing the integral structure in a mold;
using a heat source at least locally to bond together the parts constituting the integral structure;
infusing over or injecting in the new primary part an impregnation matrix; and
solidifying the new impregnated integral structure by raising it to a determined temperature.

According to an implementation in accordance with the invention, the repair method also consists in applying a vacuum or a pressure to the integral structure during the solidification step.

An advantage of the repair method in accordance with the invention lies in the localized and simplified delivery of heat, for instance by induction, onto the part that is to be repaired in order firstly to melt the thermoplastic sheet, thereby enabling the damaged portions to be separated from the integral structure, and secondly to solidify the thermoplastic sheet so as to establish a mechanical bond between the replacement portion and the remainder of the integral structure.

Another advantage of the repair method in accordance with the invention lies in its simplicity and in its small number of implementation steps.

Another advantage of the repair method in accordance with the invention lies in the possibility of repairing an integral structure, either with a portion that has previously been impregnated and solidified, or else with a portion comprising dry fibers that need to be impregnated and solidified, or with a Prepreg that needs to be solidified.

BRIEF DESCRIPTION OF THE DRAWINGS

The invention and its advantages appear in greater detail from the following description of implementations given by way of non-limiting illustration and with reference to the accompanying figures, in which.

DETAILED DESCRIPTION OF THE PREFERRED EMBODIMENTS

Elements that are structurally and functionally identical and that appear in more than one distinct figure are given the same numerical or alphanumerical references in each of them.

Figure 1:
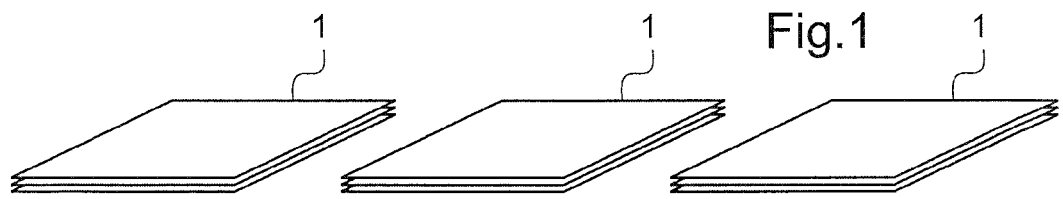
FIGS. 1 and 2 are diagrams illustrating an implementation of steps of the fabrication method in accordance with the invention for making the primary parts of the integral structure.
Figure 2:
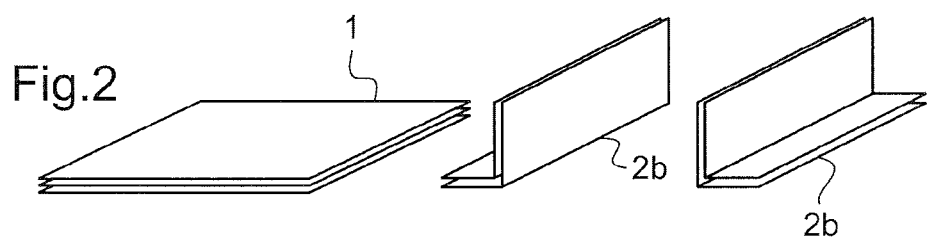

FIGS. 1 and 2 show examples of making and shaping a primary part 1 and base elements 2a, e.g. constituted by assembling layers (or "plies") of dry reinforcing fibers. The base elements 2a are shaped into intermediate elements 2b and then assembled to one another, e.g. by adhesive, so as to constitute another primary part 2c, like a profile member.

Figure 3:
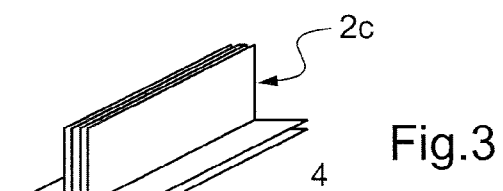
FIG. 3 is a diagram illustrating a step of assembling the integral structure as used in the fabrication method in accordance with the invention.

FIG. 3 shows how an embodiment of an integral structure 3 is assembled. The structure comprises a thermoplastic sheet 4 constituting the interface between primary parts 1 and 2c when said primary parts 1 and 2c are assembled together to constitute the integral structure 3.

Figure 4:
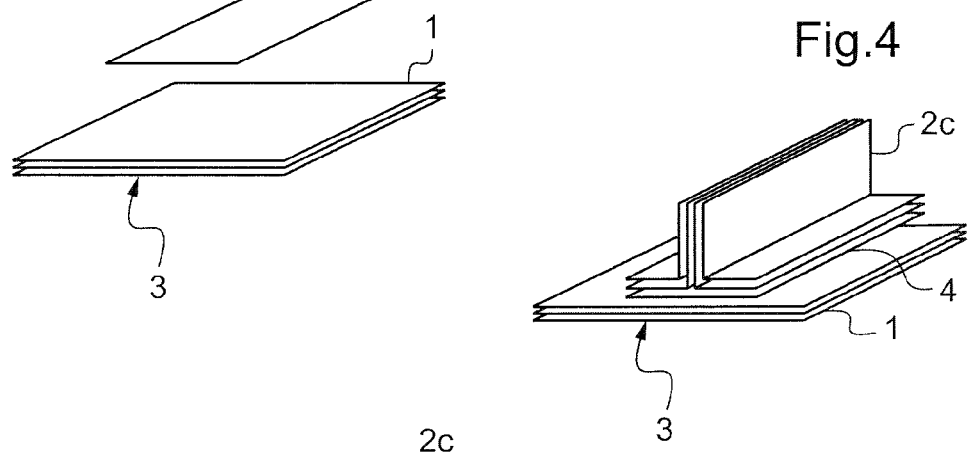
FIG. 4 is a diagram showing an embodiment of an assembled integral structure as used in the fabrication method in accordance with the invention.

The integral structure 3 is shown by way of example in FIG. 4. The mechanical bond between the primary parts 1 and 2c is obtained by melting followed by solidification of the thermoplastic sheet 3.

Figure 5:
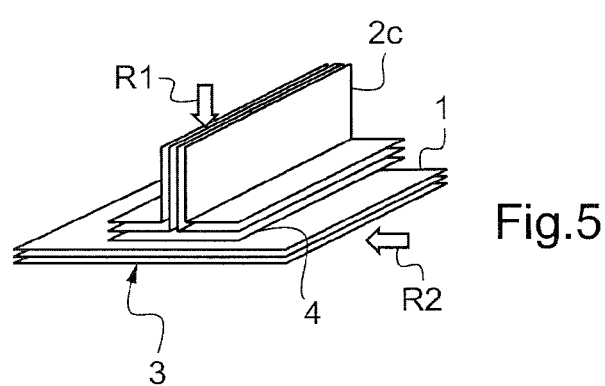
FIG. 5 is a diagram showing an operation of impregnating an integral structure in the fabrication method in accordance with the invention.

FIG. 5 is a diagram showing how the integral structure 3 is impregnated with impregnation matrices R1 and R2. In the example shown, the impregnation matrix R1, e.g. a liquid polymer resin, is injected into or infused over the primary part 2c. The other impregnation matrix R2, e.g. a liquid polymer resin, is injected into or infused over the primary part 1. The thermoplastic sheet 4 in this example enables the impregnation matrices R1 and R2 to be diffused and confined in the primary parts 2c and 1, respectively.

By way of example, the impregnation matrices R1 and R2 may be identical. Under such circumstances, in addition to mechanically bonding the primary parts 2c and 1 together, the thermoplastic sheet serves to optimize the flow of the matrix in the primary parts 2c and 1.

Figure 6:
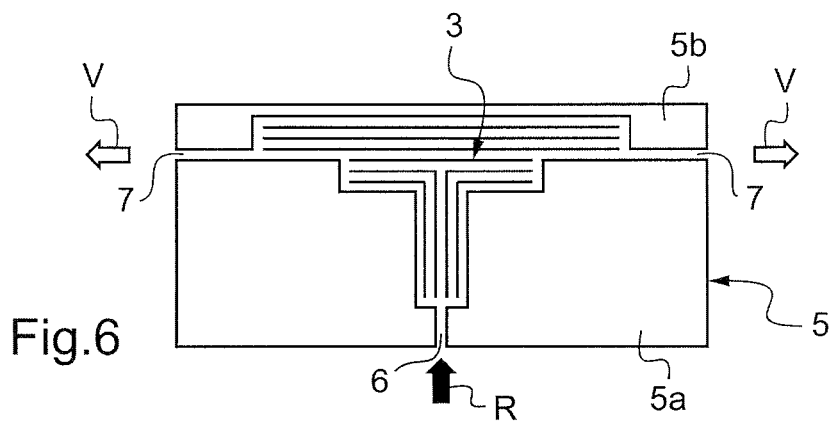
FIG. 6 is a diagram showing an example of an impregnation mold used for implementing the fabrication method in accordance with the invention.

FIG. 6 shows an embodiment of a closed mold 5 for impregnating the integral structure 3 in a single operation. The closed mold 5 has a base 5a and a cover 5b. The base 5a presents an admission opening 6 for a matrix R, and suction openings 7 connected to a vacuum source V.

Figure 7:
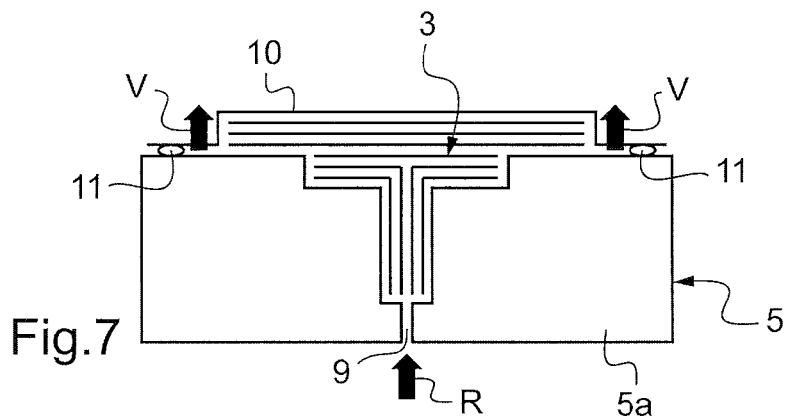
FIG. 7 is a diagram showing another example of an impregnation mold used for implementing the fabrication method in accordance with the invention.

As a variant, FIG. 7 shows a matrix of an open mold 8 for impregnating the integral structure 3 in a single operation. The open mold 8 comprises a base 8a provided with an admission opening 9 for the matrix R. The integral structure 3 resting on the base 8a is covered in a vacuum sheet 10 that is itself known. A vacuum source V serves to apply a relative vacuum in the volume defined by the base 8a and the vacuum sheet 10. Sealing between the base 8a and the vacuum sheet 10 is provided by gaskets 11.

The solidification step takes place within a mold.

Figure 8:
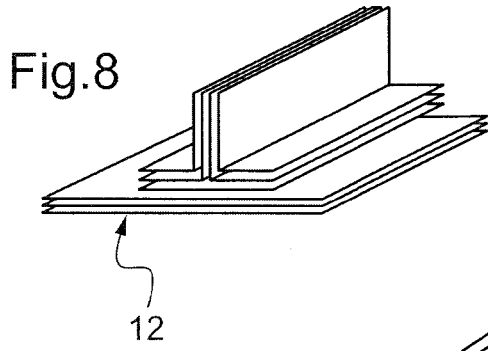
FIG. 8 is a diagram showing an embodiment of an impregnated integral structure obtained by implementing the fabrication method in accordance with the invention.

FIG. 8 shows an example of a composite part 12 obtained by the fabrication method in accordance with the invention.

Implementation of the fabrication method takes place in the manner described below.

The method of fabricating a composite part 12 presenting an integral structure 3 of composite material including at least one reinforcing layer based on reinforcing fibers, fabrics, or textiles and on at least one impregnation matrix R, R1, R2 consists in assembling the integral structure 3, placing said integral structure 3 in a mold 5, 8, impregnating said integral structure 3 with the impregnation matrix R, R1, R2 by injection or infusion, and solidifying said impregnated integral structure 3 by raising it to a determined temperature.

At least two distinct primary parts 1 and 2c are used for making up the integral structure 3.

Thereafter, the thermoplastic sheet 4 is placed on one of the primary parts 1 and 2c so as to provide the interface between said primary parts once they are assembled together.

Finally, a source of heat is used at least locally at defined positions C for bonding together the primary parts 1 and 2c prior to the injection or infusion operation.

The materials constituting the thermoplastic sheet 4 include, for example, a material that expands under the effect of heat.

Alternatively, or in addition, the materials constituting the thermoplastic sheet 4 include an electrically-conductive material.

Alternatively, or in addition, the materials constituting the thermoplastic sheet 4 include, for example, a material that is non-flammable or flame retardant.

By way of example, the primary parts 1 and 2c comprise at least two preforms comprising dry reinforcing fibers.

In a variant, the primary parts 1 and 2c comprise at least one pre-impregnated perform or a Prepreg, together with at least one preform comprising dry reinforcing fibers.

In a variant, the primary parts 1 and 2c are preforms of different kinds, one of the primary parts being a pre-impregnated preform, the other being a preform comprising dry reinforcing fibers.

By way of example, the method consists in using a single impregnation matrix R, R1, R2 for impregnating the primary part or the primary parts 1 and 2c.

In a variant, the method consists in using a primary impregnation matrix R1 for impregnating one of the two primary parts 2c, and in using a second impregnation matrix R2, different from the first impregnation matrix R1, for impregnating the other primary part(s) 1.

In another implementation, the method also consists in subjecting the impregnated integral structure 3, during the solidification step, to a vacuum or to a pressure higher than atmospheric pressure.

FIGS. 9 to 12 are diagrams showing the steps of a method of repairing a composite part 12 obtained using the fabrication method in accordance with the invention.

Figure 9:
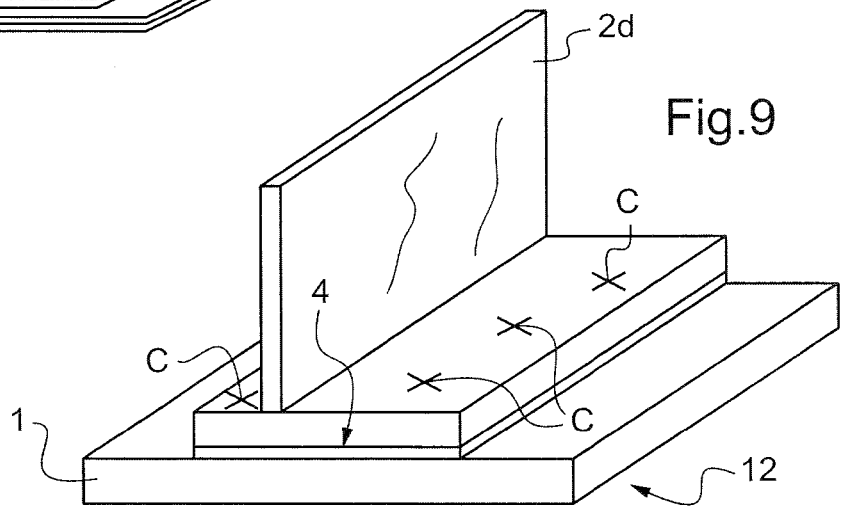
FIG. 9 is a diagram showing a first step in the repair method in accordance with the invention, consisting in applying heat locally to the interface of a primary part.

FIG. 9 shows a composite part 12 with a damaged part 2d. The damaged portion corresponds to the primary part 2c. By locally applying heating at points C in the vicinity of the interface between the damaged part 2d and the primary part 1, the thermoplastic sheet 4 is caused to melt. Such melting enables the damaged part 2d to be separated from the primary part 1.

Figure 10:
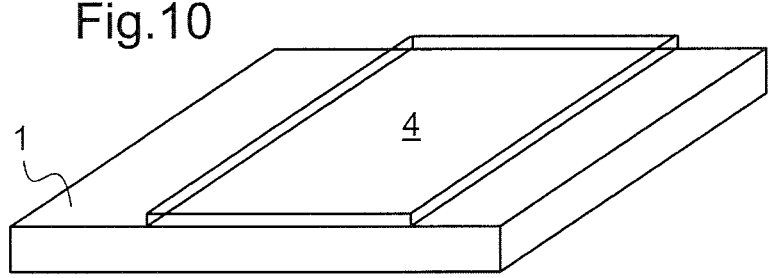
FIG. 10 is a diagram showing an integral structural part that is to be reused after removing its damaged portion, during the repair method in accordance with the invention.

The primary part 1, e.g. as shown in FIG. 10, could then be reused. It is likely however that a new thermoplastic sheet 4 would be needed.

Figure 11:
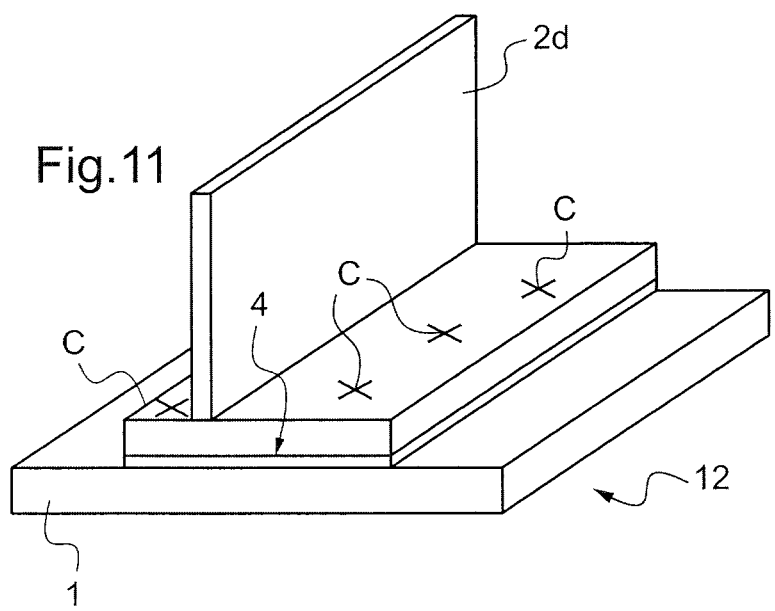
FIG. 11 is a diagram showing an assembly step in a first implementation of the repair method in accordance with the invention.

FIG. 11 shows a first implementation in which a new primary part 2e that is already impregnated and solidified is used for replacing the damaged portion 2d. Localized heating at the point C enables the thermoplastic sheet 4 to be melted, if necessary, and then to solidify so as to establish a mechanical bond between the primary part 1 and the new primary part 2e that has previously been impregnated and solidified.

In a second implementation (not shown), a new primary part 2e is used that is impregnated with resin, e.g. a Prepreg type or a pre-impregnated preform, in order to replace the damaged part 2d. After the mechanical bond has been established with the primary part 1, it is then appropriate to proceed with solidification of the assembly in a special mold.

Figure 12:
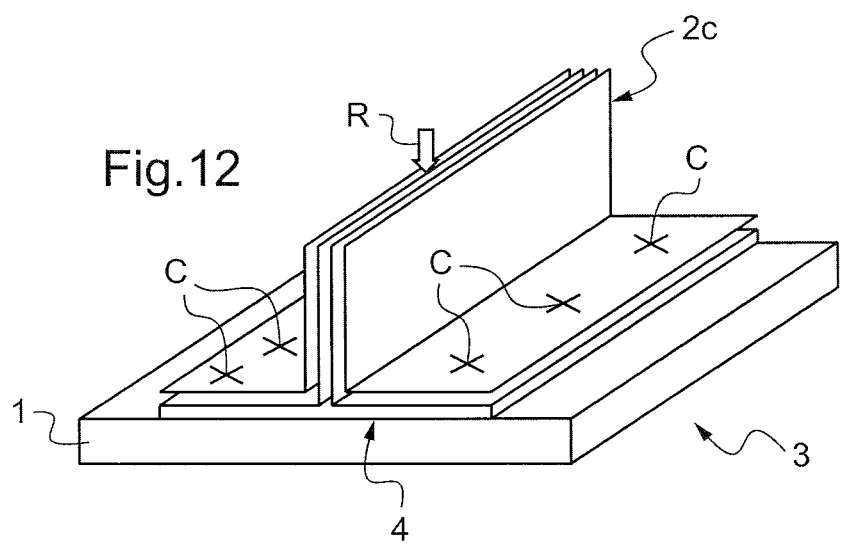
FIG. 12 is a diagram showing an assembly and impregnation step in a second implementation of the repair method in accordance with the invention.

FIG. 12 shows a third implementation in which a new primary part 2c is used that has not yet been impregnated with resin. The undamaged primary part 1 is assembled therewith in the same manner as in the above-described implementation. Once assembled, the assembly is placed in a mold in order to proceed with injecting or infusing the matrix R and preforming the final solidification step.

The repair method is thus performed in the manner described below.

The damaged composite part 12 is heated locally, at least at the junction of the primary parts, by using a heat source so as to cause the thermoplastic sheet 4 to melt.

Thereafter, the damaged primary part 2d is replaced by a new part 2e that has already been impregnated and solidified, and a thermoplastic sheet 4 is placed at the interface between the parts 1 and 2e.

Finally, the impregnated new integral structure 3 is solidified at a determined temperature or by other means (electron beam curing) and while applying a determined pressure to the interface between said primary part 1 and the new part 2e in order to bond them together by the thermoplastic sheet 4 solidifying. If the thermoplastic sheet 4 is expandable and provides pressure, one could avoid using additional external pressure.

In a variant implementation of the repair method in accordance with the invention, the composite part 12 is heated at least locally at the interface of the primary part 1 with the damaged primary part 2d by means of a heat source so as to melt the thermoplastic sheet 4.

Thereafter, the damaged primary part 2d is replaced by a preform based on dry reinforcing fibers so as to constitute the new primary part 2c.

A thermoplastic sheet 4 is placed at the interface between said primary parts 1 and 2c and the integral structure 3 as obtained in this way is placed in a closed or open mold 5 or 8.

Thereafter, a heat source is used at least locally to bond together the primary parts 1 and 2c constituting the new integral structure 3.

Once the mechanical bond has been established, the impregnation matrix is infused over or injected in the preform and the new impregnated integral structure 3 is solidified by being raised to a determined temperature.

Advantageously, the repair method consists in applying a vacuum or pressure to the new integral structure 3 during the solidification step.

Naturally, the present invention may be subjected to numerous variations as to its implementation. Although several implementations are described above, it will readily be understood that it is not conceivable to identify exhaustively all possible implementations. It is naturally possible to envisage replacing any of the means described or any of the steps described by equivalent means or equivalent steps without going beyond the scope of the present invention.

What is claimed is:

1. A method of fabricating a composite part presenting a structure of composite material comprising at least one reinforcing layer based on reinforcing fibers, fabrics, or textiles, and at least one impregnation matrix (R, R1, R2), the method comprising assembling the structure, in placing said structure in a mold, in impregnating said structure with the impregnation matrix (R, R1, R2) by injection or infusion, and in solidifying said impregnated structure by raising it to a determined temperature, the assembling comprising:

using at least two distinct primary parts for making up an integral structure;

and placing a thermoplastic sheet on at least one of the primary parts or in between the primary parts so as to make an interface of the integral structure;

wherein the thermoplastic sheet presents thickness lying in the range 0.02 mm to 1 mm and the materials constituting the thermoplastic sheet include at least one material that expands under the effect of heat, one of the at least two distinct primary parts is generally planar, and another of the at least two distinct primary parts has a planar base and a transverse flange.

2. A method according to claim 1, wherein it comprises using a source of heat, at least locally in defined positions (C), to bond together the primary parts prior to the injection or infusion operation.

3. A method according to claim 1, wherein it comprises using a thermoplastic sheet having a softening temperature lying in the range between −70° C. and 500° C. and preferably between 70° C. and 250° C.

4. A method according to claim 1, wherein it comprises using an impregnation matrix (ces) (R, R1, R2) with a solidification temperature lying in the range 20° C. to 300° C. and preferably in the range 120° C.-200° C.

5. A method according to claim 1, wherein it comprises using a thermoplastic sheet made up of one or more of the following materials, PSU, PPSU, PES, SRP, polyamides, poly(ether imide) PEI, phenoxy and copolymers.

6. A method according to claim 1, wherein the thermoplastic sheet presents thickness lying in the range 0.02 mm to 0.4 mm and most preferably in the range 0.02 to 0.05 mm.

7. A method according to claim 5, wherein the materials constituting the thermoplastic sheet include at least one electrically-conductive material.

8. A method according to claim 5, wherein the materials constituting the thermoplastic sheet include at least one flame retardant material.

9. A method according to claim 1, wherein the primary parts comprise at least two preforms comprising dry reinforcing fibers.

10. A method according to claim 9, wherein it comprises using a single impregnation matrix (R) for impregnating the primary part(s).

11. A method according to claim 1, wherein the impregnation matrix(ces) (R, R1, R2) is/are selected from a family of compositions comprising epoxies, polyamides, polyimides and cyanates esters.

12. A method according to claim 1, wherein it comprises, during the solidification step, also subjecting the impregnated integral structure to a vacuum (V) or to a pressure higher than atmospheric pressure.

13. The method according to claim 1, wherein each of the at least two distinct primary parts comprises a plurality of reinforcing layers.

* * * * *